(12) United States Patent
Leboeuf

(10) Patent No.: US 7,550,533 B2
(45) Date of Patent: Jun. 23, 2009

(54) COMPOSITION COMPRISING ACID ANHYDRIDE-GRAFTED POLYOLEFIN

(75) Inventor: Christian Leboeuf, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 257 days.

(21) Appl. No.: 11/477,871

(22) Filed: Jun. 29, 2006

(65) Prior Publication Data

US 2007/0004860 A1 Jan. 4, 2007

Related U.S. Application Data

(60) Provisional application No. 60/695,911, filed on Jul. 1, 2005.

(51) Int. Cl.
*C08L 51/06* (2006.01)

(52) U.S. Cl. .................... 525/70; 525/69; 526/329.1

(58) Field of Classification Search ................. 525/70, 525/69; 526/329.1
See application file for complete search history.

(56) References Cited

U.S. PATENT DOCUMENTS

| | | |
|---|---|---|
| 6,165,610 A | 12/2000 | Moore |
| 6,368,723 B1 * | 4/2002 | Bouilloux et al. ........ 428/476.1 |
| 2002/0034649 A1 | 3/2002 | Le Du et al. |

* cited by examiner

*Primary Examiner*—Kuo-Liang Peng

(57) ABSTRACT

A composition results from the blending of a maleic anhydride grafted metallocene linear low-density polyethylene (mLLDPE) or a maleic anhydride grafted metallocene very low-density polyethylene (mVLDPE) with an alkene or olefin polymer composition. The resultant maleic anhydride grafted polymeric composition adheres well to metal films such as aluminum film. The composition also has rheology properties making the composition efficient to use in coextrusion processes. Also provided is a method for preparing maleic anhydride grafted propylene polymer compositions.

7 Claims, No Drawings

COMPOSITION COMPRISING ACID ANHYDRIDE-GRAFTED POLYOLEFIN

This application claims priority to U.S. provisional application No. 60/695,911, filed Jul. 1, 2005, the entire disclosure of which is incorporated herein by reference.

This invention relates to a composition comprising an acid anhydride-grafted polyolefin, to a metallized composition or film comprising the acid anhydride-grafted polyolefin, to a composition comprising acid anhydride-grafted polyolefin and an ethylene copolymer, to a process for producing the metallized film, and to a product therewith such as food wrap.

BACKGROUND OF THE INVENTION

Metallized films are thermoplastic films having deposited (e.g., by vacuum) thereon a layer of metal such as aluminum. They are used in the food packaging industry as moisture and gas barriers. Metallized films can comprise polyesters such as polyethylene terephthalate (PET) or polypropylene (PP) as the thermoplastic film component. Polyethylene (PE) is also sometimes metallized. Often, metallized films are combined with other materials such as polyethylene (PE), oriented polypropylene (OPP), oriented PET (OPET), paper and paperboard in multilayer structures. These other materials may serve as, for example, abuse layers or sealant layers. They may also provide stiffness and a surface for printing. Thus, multilayer structures comprising metallized film layers adhered to thermoplastic compositions and other substrates can be used as packaging films. Applications include many dry food packages such as powdered drink mix pouches as well as non-packaging applications. Examples of the abuse and/or printed layer include oriented polyethylene terephthalate, polypropylene, either oriented or cast, high density polyethylene (HDPE), paper, paperboard, and biaxally oriented nylon. Examples of the sealant film include low density polyethylene (LDPE), ethylene/vinyl acetate (EVA) copolymers, ionomers (i.e. partially neutralized ethylene/acid copolymers), linear low density PE (LLDPE), and very low density PE (VLDPE).

An adhesive can adhere the metallized surface of the film to the adjoining layer. For example, low-density polyethylene (LDPE) is used as an adhesive layer. Other adhesive layers include ethylene acid copolymers. See e.g., U.S. Pat. No. 6,165,610.

Adhesion of substrates to metallized film using LDPE can be accomplished by processing at high coating temperatures (300 to 330° C.) so that a portion of the polyethylene oxidizes. Oxidization of the LDPE creates polar species that provide moderate adhesion to the metallized surface.

A problem associated with using LDPE to extrusion laminate PE-films to metallized films is that the adhesion of the metallized layer to its base film "ages down" with time. For example, adhesion of LDPE to metallized film is only marginal to begin with, but over a time period of one to several weeks, the bond strength often declines to a level that is no longer functional for the application. One explanation may be that the aging is associated with secondary crystallinity of the LDPE. During the lamination process, the LDPE is quenched very quickly and little primary crystallization can occur. Over time, small "secondary" crystals may form. As PE crystallizes, it shrinks. Shrinkage can put a stress on bonds and reduce peel strength. The bond between the vacuum deposited metallized layer and its base film is the weakest of the bonds in the structure.

More polar polymers adhere to metallized film more readily than less polar materials. Polar polymers that adhere well to metallized film may not adhere well to nonpolar polymers. Therefore, a tie layer providing a balance of properties that allow it to adhere both to metallized film and to non-polar polymers is desirable.

Chemical primers, used to promote adhesion to thermoplastic film substrates, add costs and may cause environmental concerns with solvent-based systems. It is desirable to develop composition or method for adhering metallized film to film or polymers without using primers.

SUMMARY OF THE INVENTION

The invention includes a metallizable alkene or olefin polymer composition. The composition comprises or is produced from a polyolefin and an acid anhydride-grafted second polyolefin, acid anhydride monoester-grafted ethylene polymer, or both. The acid anhydride can include maleic acid, fumaric acid, succinic anhydride, or combinations of two or more thereof. The monoester of acid anhydride can include monoester of maleic anhydride, monoester of succinic anhydride, monoester of fumaric anhydride, monoester of succinic anhydride, or combinations of two or more thereof. The acid anhydride-grafted ethylene polymer can be present in the composition from about 0.001 to about 5%, or about 0.01 to about 4%, or about 0.1 to about 4% and the acid anhydride monoester-grafted ethylene polymer is present in the composition from about 0.1 to about 20%, about 0.5 to about 15%, or about 1 to about 10%.

The invention also includes a film comprising or produced from the composition and a metallized film such as aluminum film.

The invention also includes a packaging film comprising a first layer comprising a metal film, a second layer comprising a composition as disclosed above.

The invention also provides a food wrap that can protect against permeation of moisture and oxygen. The wrap can comprise or consist essentially of a packaging film or metallized polyolefin (e.g., propylene) layer and one or more layers comprising a polyolefin wherein the metallized polyolefin layer comprises or is produced a polyolefin and maleic anhydride (or its monoester) grafted mLLDPE (metallocene-catalyzed linear low-density PE), maleic anhydride (or its monoester) grafted mVLDPE (metallocene-catalyzed very low-density PE), maleic anhydride (or its monoester) grafted LLDPE, VLDPE, ULDPE, an ethylene copolymer or combinations of two or more thereof. The wrap preferably has an additional polypropylene barrier layer and a heat sealable layer.

The invention also includes a process that can be used for producing maleic anhydride grafted polyolefin composition or film thereof. The process comprises or consists essentially of combining a polyolefin with an acid anhydride in the presence of an organic peroxide under a condition effective to graft the acid anhydride to the polyolefin.

DETAILED DESCRIPTION OF THE INVENTION

"Metallizable" means capable of effectively binding to a metal. The acid anhydride can include any acid anhydride, its monoester, or combinations thereof. Examples of acid anhydride include maleic anhydride, monoester of maleic anhydride, succinic anhydride, monoester of succinic anhydride, fumaric anhydride, monoester of fumaric anhydride, or combinations of two or more thereof.

Polyolefin can include any polymer comprising repeat units derived from an olefin and includes polyethylene, polypropylene, polybutylene, polyisobutylene, and a copolymer of any of these polyolefins. Such copolymer can include comonomers including butene, hexene, octene, decene, dodecene, or combinations of two or more thereof.

For example, polypropylene (PP) polymers include homopolymers, random copolymers, block copolymers and terpolymers of propylene. Copolymers of propylene include copolymers of propylene with other olefins such as ethylene, 1-butene, 2-butene and the various pentene isomers, etc., and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. "Polypropylene refers to any or all of the polymers comprising propylene described above. PP can be produced by well known processes such as Ziegler-Natta catalyst systems. Because the processes are well known, the description of which is omitted here for the interest of brevity.

Example also includes copolymer of propylene and ethylene having low levels of the ethylene monomer of between about 1% to about 6% by weight. Additional examples of modified-polypropylene compositions that produce the intended effect of improving adhesion of polypropylene to aluminum are presented in TABLE 3.

Ethylene polymer can be HDPE, LLDPE, VLDPE, ultra low density polyethylenes (ULDPE), LDPE, mLLDPE, mVLDPE, an ethylene copolymer, or combinations of two or more thereof. PE can be prepared by a variety of methods, including well-known Ziegler-Natta catalyst polymerization (see e.g., U.S. Pat. Nos. 4,076,698 and 3,645,992), metallocene catalyst polymerization (see e.g., U.S. Pat. Nos. 5,198,401 and 5,405,922) and by free radical polymerization. Polyethylene polymers can include HDPE, LLDPE, very low or ultra low density polyethylenes (VLDPE or ULDPE), and LDPE. The densities of polyethylenes range from 0.865 g/cc to 0.970 g/cc. "Polyethylene" refers to any or all of the polymers comprising ethylene described above.

Acid anhydride- or acid anhydride monoester-grafted ethylene polymer can be produced by any means known to one skilled in the art. For example, grafts can be produced by melt extrusion of the polyolefin in the presence of both a radical initiator and acid anhydride or its monoester, in a twin-screw extruder. The polymeric backbone on which an acid anhydride (e.g., maleic anhydride) functionality is grafted can be either any polyolefins disclosed above such as LLDPE, VLDPE, mLLDPE, mVLDPE, or combinations of two or more thereof.

Acid anhydride or acid anhydride monoester can be present in the composition, based on the concentration of acid anhydride or acid anhydride monoester, ≧about 3.0, ≧about 4, ≧about 5, ≧about 6, or even≧about 7 wt %.

A metallizable composition that binds to a thin film of metal can be produced from or comprise an ethylene copolymer. The metal film is preferably a vacuum deposited aluminum layer.

Ethylene copolymer can comprise polymer units (repeat units) derived from ethylene and an unsaturated carboxylic acid, a salt of the acid, an ester of the acid, an ester of the salt, such as (meth)acrylate or $C_1$ to $C_8$ alkyl (meth)acrylate, or combinations of two or more thereof. "Alkyl (meth)acrylate" can include alkyl acrylate, alkyl methacrylate, or both. "(Meth)acrylic acid" can include acrylic acid, methacrylic acid, or both. For example, methyl (meth)acrylate can refer to either methyl methacrylate or methyl acrylate.

Examples of alkyl acrylates include methyl acrylate, ethyl acrylate and butyl acrylate. For example, "ethylene/methyl acrylate (EMA)" means a copolymer of ethylene and methyl acrylate (MA); "ethylene/ethyl acrylate (EEA)" means a copolymer of ethylene and ethyl acrylate (EA); "ethylene/butyl acrylate (EBA)" means a copolymer of ethylene and butyl acrylate (BA); and includes both n-butyl acrylate and iso-butyl acrylate; and combinations of two or more thereof.

Copolymers of ethylene and an acrylate are well known. "Ethylene acrylate copolymers" may also be referred to as ethylene-acrylic acid ester copolymers. They can be manufactured from two high-pressure free radical processes: tubular processes or autoclave processes. The difference in ethylene acrylate copolymers made from the two processes is described in, e.g., "High flexibility EMA made from high pressure tubular process." Annual Technical Conference—Society of Plastics Engineers (2002), 60th(Vol. 2), 1832-1836. The ethylene acrylate copolymer produced from the tubular process is preferred in the invention herein.

Ethylene copolymer can also include another comonomer such as carbon monoxide, glycidyl acrylate, glycidyl methacrylate, and glycidyl vinyl ether, or combinations of two or more thereof.

The ethylene copolymer may contain about 15 to about 40, or about 18 to about 35, wt % of acrylate comonomer. Increasing acrylate comonomer may improve the elastomeric properties and increase the tackiness of the copolymer. The ethylene copolymer may have a melt index (MI) of from about 0.1 to about 100, or about 0.5 to about 20, g/10min, measured with ASTM D-1238, condition E (190° C., 2160 gram weight).

Ethylene copolymer also includes an acid copolymer comprising repeat units derived from ethylene and an unsaturated carboxylic acid such as (meth)acrylic acid, maleic acid, fumaric acid, maleic anhydride, fumaric anhydride, maleic acid monoester, fumaric acid monoester, or combinations of two or more thereof. "(Meth)acrylic", refers to acrylic acid, methacrylic acid, or combinations thereof. For example, "ethylene/methacrylic acid (EMM)" means a copolymer of ethylene (E) and methacrylic acid (MAA); "ethylene/acrylic acid (EAA)" means a copolymer of ethylene and acrylic acid (EAA). Examples of more than one comonomer are also included. For example "ethylene/isobutyl acrylate methacrylic acid (E/iBA/MM)" means a terpolymer of ethylene (E), iso-butyl acrylate (iBA) and methacrylic acid (MAA). The acid copolymer can comprise about 1 to about 25 mole % of repeat units derived from an acid or anhydride or monoester of a diacid.

(Meth)acrylic acid comonomer incorporated into ethylene acid copolymer can vary from 0.01 or 5 up to as high as 40 wt % of the total copolymer or even higher such as from 5 to 30, or 10 to 25, wt %. The acid copolymer may also contain up to 10 wt % of an alkyl acrylate having an alkyl group with a $C_1$-$C_8$ alkyl acrylate.

Alternatively, alkyl (meth)acrylate or (meth)acrylic acid comonomer incorporated into ethylene copolymer can vary from about 0.01 or about 30, from 1 to 25, or from 1 to 10, wt %. Alternatively, an alkyl (meth)acrylate such as n-butyl acrylate or a (meth)acrylic acid can incorporate into the polymer present in ≦about 6 wt % or ≦about 5 wt % or ≦about 4 wt % or ≦about 3 wt % or even ≦about 1 wt %.

Ethylene acid copolymers and their methods of preparation are well known in the art such as disclosed in U.S. Pat. Nos. 3,264,272, 3,404,134, 3,355,319 and 4,321,337. Commercial acid copolymers suitable for use in the invention herein are available from various sources, including the E. I. du Pont de Nemours and Company, Wilmington, DE (DuPont) under the trademark NUCREL.

Ethylene acid copolymers may be direct copolymers or graft copolymers. 'Direct copolymer' is a copolymer made by polymerization of monomers together, at the same time, as distinct from a graft copolymer where a monomer is polymerized on an existing polymer chain. When direct or graft acid copolymers have from about 0.0001 to about 90 percent of the carboxylic acid groups ionized by neutralization with metal ions, these are termed ionic copolymers, or "ionomers", which have solid state properties characteristic of crosslinked polymers and melt-fabricability characteristics of uncrosslinked thermoplastic polymers. Commercial ionomers include Surlyn ionomers from DuPont.

The acid copolymer or ionomer is preferably present in an amount ranging from about 5% to about 50% by weight, more preferably from about 10% to about 30% by weight, and most preferably about 8% to about 15% by weight. The acid copolymer preferably contains about 4 to about 25 weight percent of acid, and more preferably about 8 to about 15 weight percent of acid. The acid copolymer may have a melt index of from 0.1 to 500, preferably 1 to 100, most preferably 1 to 30 grams/10 minutes.

The ionomers may have a melt index of from about 0.1 to 100, or about 0.5 to 20 g/10 minutes, be derived from an acid copolymer having about 4 to about 25, or about 8 to about 15, wt % of acid, and have a degree of neutralization ranging from about 20 to 70 wt %.

The acid anhydride- or acid anhydride monoester-grafted ethylene polymer can be present in the composition, based on the concentration of acid anhydride or acid anhydride monoester, raging from about 0.5 to about 5, about 1 to about 4, or about 1 to about 2 wt %.

A multilayer barrier film such as food wrap can include a layer comprising the polymeric composition disclosed above as a metallizable layer. For example, layer 1 can be a thin metal film, which may be produced by vacuum deposited metal such as aluminum, copper, silver chromium, gold, alloy of two or more thereof, or combinations of two or more thereof. This layer may function as a barrier to oxygen and moisture. Layer 2 can be a metallizable polymeric layer. This layer can comprise the metallizable polymeric composition disclosed above such as that comprising a polyolefin and acid anhydride-grafted second polyolefin. Layer 2 can have a thickness of about 10 to about 25μ. The third layer can be adhered to layer 2 and comprise a polyolefin such as polypropylene. It can function as a barrier and can have a thickness of about 10 to about 25μ. Layer 4 can be adhered to layer 3. The fourth layer 16 can be a heat sealable polyolefin layer. The polyolefin may be polypropylene, polypropylene/polyethylene copolymer, elastomer, polypropylene/butene-1 copolymer, polypropylene/polyethylene/butene-1 terpolymer, poly ketone, or combinations of two or more thereof.

One or more layers can also contain one or more additives. Examples of additives include, anti-blocks, anti-static agents, coefficient of friction modifiers, processing aids, and colorants, clarifiers. These are additives well known in the art.

An exposed or outermost layer of the multilayer film can be surface-treated to make the film receptive to printing inks, adhesives and coatings. These surface-treated layers may subsequently be laminated onto other films or surfaces. The surface treatment can be carried out by any method known in the art such as corona discharge treatment or flame treatment.

Optionally, a coating may be applied to one or both of the exposed surfaces of outermost layers of a film to facilitate lamination. Prior to application of the coating material, the film may be surface-treated or primed with a primer layer. Example coatings include acrylic coatings and PVDC (polyvinylidene chloride) coatings. A vinyl alcohol polymer may also be used as a coating composition. Appropriate primer materials are poly(ethyleneimine), epoxy primers, and the like.

The outer surface of a film may be treated as noted above to increase its surface energy and therefore insure that the coating layer may be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, corona treatment, and the like. Corona treatment comprises exposing the film surface to a high voltage corona discharge while passing the film between a pair of spaced electrodes. After corona treatment of the film surface, the coating composition is then applied thereto.

Treated or untreated surfaces may be laminated together with a suitable adhesive, e.g., a hot melt adhesive such as low density polyethylene, ethylene-methacrylate copolymer, water-based adhesives such as polyvinylidene chloride latex, and the like.

EXAMPLES

Metallizable polypropylene compositions were obtained by blending pellets of the modifier of choice (TABLE 2) into pellets of the base resin of choice (TABLE 1), and by feeding directly the pellet blend to an extruder of a film casting line equipped with at least 3 extruders, thus capable of extruding 3 different resins, using an extrusion die equipped with a proper block to split the different feed materials. Thus two (2) different polypropylene (PP) resins were modified with twenty three (23) different PP modifiers listed in TABLE 2. The PP base resins were modified, in some instances, at two or more different levels, to show the adhesion response to increasing levels of modifiers.

TABLE 1

| BASE RESIN | TYPE | MI (190° C./2.16 Kg) | T (° C.) |
|---|---|---|---|
| B1 | P/E/B Terpolymer[1] | 6-8 | 138 |
| B2 | P/E Copolymer[2] | 5 | 134 |

[1]Chisso's FW4BM, a terpolymer of propylene, ethylene, and butene.
[2]Dow's 6D81, copolymer of propylene and ethylene.

TABLE 2

| Modifier | Base polymer | % Man-g[20] | Acid (%) | Ester (%) | MI (190° C./2.16 kg) |
|---|---|---|---|---|---|
| M1 | Dow's 5D98 (homoPP)[1] | 0.55 | — | — | 120 |
| M2 | Fina 8453 (coPP)[2] | 1.40 | — | — | 450 |
| M3 | ENGAGE ® 8180[3] | 0.8 | — | — | 1.30 |
| M4 | ENGAGE 7447[4] | 0.9 | — | — | 3.00 |
| M5 | ENGAGE 7447 | 1.7 | — | — | 0.99 |
| M6 | ENGAGE 7447 | 1.83 | — | — | 0.84 |
| M7 | ENGAGE 8411[5]/Dow 6D20[6] (80/20) | 1.56 | — | — | 85 |
| M8 | SURLYN RX1014[7] | | AA(10.5) | nBA(15.5) | |
| M9 | SURLYN RX1018[8] | | AA(6.2) | nBA(28) | |

TABLE 2-continued

| Modifier | Base polymer | % Man-g[20] | Acid (%) | Ester (%) | MI (190° C./2.16 kg) |
|---|---|---|---|---|---|
| M10 | ELVALOY ® 4924[9] | — | CO(8) | VA(20.5) | 9.0 |
| M11 | ELVALOY ® HP 441[10] | — | CO(10) | nBA(29) | 8.0 |
| M12 | BYNEL ® 2002[11] | — | AA | MA | 10 |
| M13 | BYNEL ® 2022 | — | AA | MA | 35 |
| M14 | LOTADER 2210[12] | 2.6(co-MAH) | — | NBA(25) | 3.0 |
| M15 | LOTADER 3410[13] | 3(co-MAH) | — | nBA | 5.0 |
| M16 | LOTADER TX8030[14] | 2.8(co-MAH) | — | EA | 3.0 |
| M17 | LOTADER AX8840[15] | — | — | GMA | 5.0 |
| M18 | OREVAC 9314[16] | co-MAH | — | VA | 2.0 |
| M19 | ENGAGE 7447 | 1.82 | — | — | 1.24 |
| M20 | ENGAGE 7447 | 2.56 | — | — | 0.63 |
| M21 | FUSABOND EP 1021[17] | 9.5% MAME | — | — | — |
| M22 | FUSABOND A EB 560D[18] | 1.9% MAME | — | — | 3.5 |
| M23 | LOTADER 4210[19] | 3.8(co-MAH) | — | nBA | 9.0 |

[1]Polypropylene homopolymer.
[2]Copolymer of propylene and ethylene.
[3]ENGAGE ® 8180 copolymer of ethylene and octene, obtained from DuPont Dow Elastomers
[4]ENGAGE ® 7447, copolymer of ethylene and octene, obtained from DuPont Dow Elastomers
[5]ENGAGE ® 8411, copolymer of ethylene and octene, obtained from DuPont Dow Elastomers
[6]Dow's 6D20: propylene and ethylene copolymer
[7]SURLYN RX1014 is an ionomer comprising units derived from 10.5 wt % from acrylic acid (AA) and 15.5 wt % from n-butyl acrylate
[8]SURLYN RX1018 is an ionomer comprising units derived from 6.2 wt % from acrylic acid (AA) and 28.0 wt % from n-butyl acrylate
[9]ELVALOY ® 4924 is a terpolymer of ethylene/vinyl acetate/carbon monoxide from DuPont
[10]ELVALOY ® HP 441 is a terpolymer of ethylene/n-butyl acrylate and carbon monoxide from DuPont
[11]BYNEL ® 2002 is a terpolymer of ethylene/ethyl acrylate/acrylic acid
[12]LOTADER 2210 is a terpolymer of ethylene/butyl acrylate (6%) and maleic anhydride (2.6%) from AtoFina
[13]LOTADER 3410 is a terpolymer of ethylene/butyl acrylate (18%) and maleic anhydride (3%) from AtoFina
[14]LOTADER TX 8030 is a terpolymer of ethylene/butyl acrylate (12.5%) and maleic anhydride (2.5%) from AtoFina.
[15]LOTADER AX8840 is an ethylene/glycidyl methacrylate (8%) copolymer from AtoFina
[16]OREVAC 9314 is a terpolymer of ethylene/vinyl acetate/maleic anhydride from AtoFina
[17]FUSABOND EP 1021 is a copolymer of ethylene and MAME (maleic anhydride mono ester, 9.5%)
[18]FUSABOND A EB 560D is a blend of FUSABOND EP 1021 and ELVALOY ® AC 3427
[19]LOTADER 4210, a terpolymer of ethylene/butyl acrylate (6%)/maleic anhydride (3.8%) from AtoFina
[20]Content in % maleic anhydride grafted Compositions of modified PP, used as metallizable PP layer in 3-layer constructions, are listed in TABLE 3, in the column under "TOP LAYER"

TABLE 3 cPP 3-LAYER FILM STRUCTURES

| Film[1] | Top Layer[b] | Core Layer | Bottom Layer | Code[c] | Adhesion (g/in)[d] |
|---|---|---|---|---|---|
| F1 | B2 | Dow 5D98 | Dow 7C06 | MF1 | 110 |
| F2 | B2 | Dow 5D98 | Dow 706 | MF2 | 75 |
| F3 | B2 | Dow 5D98 | Dow 706 | MF3 | 58 |
| F4 | B2 | Dow 5D98 | Dow 6D20 | MF4 | 203 |
| F5 | B1 | Dow 5D98 | Dow 6D20 | MF5 | 257 |
| F6 | B2 | Dow 5D98 | Dow 6D20 | MF6 | 163 |
| F7 | B1 | Dow 5D98 | Dow 6D20 | MF7 | 247 |
| F8 | B2 | Dow 5D98 | Dow 6D20 | MF8 | 210 |
| F9 | B1 | Dow 5D98 | Dow 6D20 | MF9 | 225 |
| F10 | B2 | Dow 5D98 | Dow 6D20 | MF10 | 230 |
| F11 | B1 | Dow 5D98 | Dow 6D20 | MF11 | 271 |
| F12 | B2 | Dow 5D98 | Dow 6D20 | MF12 | 118 |
| F13 | B1 | Dow 5D98 | Dow 6D20 | MF13 | 102 |
| F14 | B2 | Dow 5D98 | Dow 6D20 | MF14 | 65 |
| F15 | B1 | Dow 5D98 | Dow 6D20 | MF15 | 90 |
| F16 | B1 | Dow 5D98 | Dow 6D20 | MF16 | 64 |
| F17 | B1 | Dow 5D98 | Dow 6D20 | MF17 | 74 |
| F18 | B1 | Dow 5D98 | Dow 6D20 | MF18 | 86 |
| F19 | B1 | Dow 5D98 | Dow 6D20 | MF19 | 78 |
| F20 | B1 | Dow 5D98 | Dow 6D20 | MF20 | 84 |
| F21 | B1 | Dow 5D98 | Dow 6D20 | MF21 | 57 |
| F22 | B1 | Dow 5D98 | Dow 6D20 | MF22 | 46 |
| F23 | B1 | Dow 5D98 | Dow 6D20 | MF23 | 75 |
| F24 | B1 | Dow 5D98 | Dow 6D20 | MF24 | 92 |
| F25 | B1 | Dow 5D98 | Dow 6D20 | MF25 | 78 |
| F26 | B1 | Dow 5D98 | Dow 6D20 | MF26 | 107 |
| F27 | B1 | Dow 5D98 | Dow 6D20 | MF27 | 89 |
| F28 | B1 | Dow 5D98 | Dow 6D20 | MF28 | 101 |
| F29 | B1 | Dow 5D98 | Dow 6D20 | MF29 | 66 |
| F30 | B1 | Dow 5D98 | Dow 6D20 | MF30 | 61 |
| F31 | B1 | Dow 5D98 | Dow 6D20 | MF31 | 80 |
| F32 | B1 | Dow 5D98 | Dow 6D20 | MF32 | 87 |
| F33 | B1 | Dow 5D98 | Dow 6D20 | MF33 | 93 |
| F34 | B2 | Dow 5D98 | Dow 6D20 | MF34 | 227 |
| F35 | B2 | Dow 5D98 | Dow 6D20 | MF35 | 331 |
| F36 | B2 | Dow 5D98 | Dow 6D20 | MF36 | 278 |
| F37 | B2 | Dow 5D98 | Dow 6D20 | MF37 | 157 |
| F38 | B2 | Dow 5D98 | Dow 6D20 | MF38 | 194 |
| F39 | B2 | Dow 5D98 | Dow 6D20 | MF39 | 283 |
| F40 | B2 | Dow 5D98 | Dow 6D20 | MF40 | 198 |
| F41 | B2 | Dow 5D98 | Dow 6D20 | MF41 | 252 |
| F42 | B2 | Dow 5D98 | Dow 6D20 | MF42 | 282 |
| F43 | B2 | Dow 5D98 | Dow 6D20 | MF43 | 143 |
| F44 | B2 | Dow 5D98 | Dow 6D20 | MF44 | 197 |
| F45 | B2 | Dow 5D98 | Dow 6D20 | MF45 | 242 |
| F46 | B2 | Dow 5D98 | Dow 6D20 | MF46 | 157 |
| F47 | B2 | Dow 5D98 | Dow 6D20 | MF47 | 234 |
| F48 | B2 | Dow 5D98 | Dow 6D20 | MF48 | 332 |

TABLE 3-continued cPP 3-LAYER FILM STRUCTURES

| Film[1] | Top Layer[b] | Core Layer | Bottom Layer | Code[c] | Adhesion (g/in)[d] |
|---|---|---|---|---|---|
| F49 | B2 | Dow 5D98 | Dow 6D20 | MF49 | 333 |
| F50 | B2 | Dow 5D98 | Dow 6D20 | MF50 | 237 |
| F51 | B2 | Dow 5D98 | Dow 6D20 | MF51 | 180 |
| F52 | B2 | Dow 5D98 | Dow 6D20 | MF52 | 236 |
| F53 | B2 | Dow 5D98 | Dow 6D20 | MF53 | 165 |
| F54 | B1 | Dow 5D98 | Dow 6D20 | MF54 | 149 |

[a]This column designates a film structure;
[b]Top layer polymer content (weight % in parentheses) were: Film F1 (100); F2-F3 (80); F4-F13 (84); F14 and F17-F24 (92.5); F13 (90); F15 (90); F25-F34 and F39 (90); F35 (94); F36 (78); F37 (95.6); F38 (92.9); F40 (96.8); F41 (94.9); F42 (92.8); F43 (98.3); F44 (97.3); F45 (96.2); F46 (94.9); F47 (91.6); F48 (86.6); F49 (81.1); F50 (97.9); F51 (96.6); F52 (95.3); F53 (94.9); and F54 (84). Modifier made up the rest (to 100%). This column designates base resins.
[c]This column designates a modifier composition.
[d]VM-cPP Film (3-layer PP-based film, top layer made of modified-PP, core layer of 5D98 homo-PP, bottom layer of 6D20 co-PP)

Each modified PP composition was coextruded, using an 8 inch (about 20 cm) coextrusion casting line, in a 3-layer film, using Dow's 5D98 homo-PP as core layer, and Dow's 7C06 impact-modified PP, or Dow's 6D20 co-PP, as backing layer. Each film construction was first corona-treated to about 41-45 dynes/cm, then metallized with Aluminum (about 200 nm thick layer). Adhesion of the metallizable layer to the deposited aluminum was evaluated after heat sealing, using a double-bar heat sealer, the aluminum top layer to a NUCREL film, which was an ethylene acid copolymer available from DuPont. One-inch (2.54 cm) wide strips were cut out of the heat-sealed substrates, peel was initiated manually and peel strength, at the aluminium/modified-PP interface, was measured by Instron. Adhesion performance within all metallized 3-layer PP film constructions is shown in TABLE 3. The performance of each metallized 3-layer PP film construction is described in TABLE 3, under peel strength in g/in peel force. Minimum "acceptable" for full functionality Peel Strength is 130 g/in, based on existing commercial film.

Films F1, F2 and F3 illustrate the impact of modification of the top PP layer, using maleic anhydride grafted PP. It was inadequate to meet target adhesion. It was also established very early on that Corona treatment enhanced adhesion and for all examples shown in TABLE 3, the 3-layer PP film was Corona treated before metallization.

The adhesion data presented in TABLE 3 included several film structures that met or exceeded minimum adhesion target of 130 g/in, as well as several that fail to do so. In summary, these examples disclose the following, in terms of the type of modifiers that produced good adhesion of modified-PP to Aluminum, and those that did not.

Efficient Modifiers:
  MAH-g-mVLDPE (M3 to M6, M19, M20), MF4 to MF11, MF36 to MF44;
  E/MAME copolymer (M21), MF45 to MF48;
  E/MAME copolymer+ELVALOY® AC (M22), MF49 to MF51; and
  E/nBA/MAH Terpolymer (M23), MF52 to MF55;
Inefficient Modifiers:
  coPP/mVLDPE co-grafts with MAH (M7), MF12, MF13, MF16, MF17;
  E/nBA/M Terpolymer (M8, M9), MF18, MF19, MF27, MF28;
  E/VA/CO Terpolymer (M10), MF20, MF29;
  E/nBA/CO Terpolymer (M11), MF21, MF30;
  E/MA/AA Terpolymer (M12, M13), MF22, MF23;
  E/nBA/MAH Terpolymers (M14, M15), MF24, MF25, MF31, MF32 MAH ≦3.0%; nBA>6%;
  E/EA/MAH Terpolymer (M16), MF26, MF33;
  E/GMA Copolymer (M17), MF34; and
  ENA/MAH Terpolymer (M18), MF35.

Preparation of Metallized Polymeric Composition

Square film coupons measuring 4 inches×4 inches (about 11 cm×11 cm) were treated in a vacuum metallization chamber. The vacuum system was pumped down to $2 \times 10^{-5}$ torr and the aluminum was heated such as to deposit on the film surface at a rate of 5 Å per second to a thickness of 200 Angstroms. The thickness of the deposited aluminum layer was determined by either surface resistivity or light transmission, using pre-established correlations, both are methods well-known to one skilled in the art.

Preparation of Multi Layer Metallized Polymeric Films

Films for adhesion performance evaluation were cast on a pilot-scale co-extrusion line equipped with three extruders, a Killion 8" wide cast roll unit and a Cloeren 8" (5-vane) cast film die configured to run with three resin feeds.

Die configuration: AABBC selector plug.
A: 1¾" Diameter NRM Single Screw Extruder, feeding the material chosen for the inner layer.
B: 1.0" Diameter Davis Standard Single Screw, feeding the material selected as core layer.
C: 1¼" Diameter Wayne Single Screw Extruder, feeding the modified-PP composition.
Total line speed: 20 fpm (9.1 meters/min)
Total film thickness: 3 mil (about 0.008 cm).
The temperatures used are shown in Table 4 below.

TABLE 4

| | Temperatures (° C.) | | | | | | | | |
|---|---|---|---|---|---|---|---|---|---|
| Extruder | Zone 1 | Zone 2 | Zone 3 | Zone 4 | Adaptor | Coupling | Transfer Line | $T_{melt}$ | RPM |
| A | 180 | 210 | 220 | — | 220 | 220 | 220 | 227 | 6.1 |
| B | 180 | 210 | 220 | 220 | 227 | 220 | 220 | 227 | 32.9 |
| C | 180 | 220 | 221 | 220 | 220 | 220 | 220 | 223 | 17 |

| Cloeren Die - Temperatures (° C.) | | | |
|---|---|---|---|
| back | left hand flange | front | right hand flange |
| 220 | 224 | 218 | 223 |

The 3-layer cast films were subsequently corona-treated. Corona-treatment parameters were set to obtain a final surface energy of 41 dynes/cm$^2$, at a line speed of 100 ft/min (45.5 mpm).

Adhesion Test Used

The adhesion of the polymeric metallizable layer to the vacuum deposited aluminum film was measured using the following method. The vacuum metallized coupons were first heat-sealed with a NUCREL 903 film, over the Aluminum layer, using a Sencorp Systems heat-sealer that has 2×1 inch (5.1×2.54 cm) wide separately heated sealing bars. The NUCREL film was sealed under 40 psi/135° C. (1 psi=0.275 MPa) for a dwell time of 0.5 sec. Peel was initiated at the modified-PP/aluminum interface, and peel force was then measured using an Instron mechanical tester, under ambient conditions, at a jaw speed of 12 inch/min (305 cm per min). Results were reported in lb. ft/in.

The invention claimed is:

1. A film produced from a composition and a metalized film wherein the composition consists essentially of a polyolefin, a modifier, optionally an ethylene copolymer derived from ethylene and alkyl (meth)acrylate, (meth)acrylic acid, or combinations thereof, optionally from an acid anhydride or an acid anhydride monoester, wherein
   the modifier is a maleic anhydride-grafted ethylene polymer, an ethylene butyl acrylate maleic anhydride copolymer, an ethylene maleic acid monoester copolymer, or combinations of two or more thereof;
   the ethylene polymer is a metallocene-catalyzed linear low-density polyethylene, a metallocene-catalyzed very low-density polyethylene, an ethylene polymer, or combinations of two or more thereof;
   the maleic anhydride-grafted ethylene polymer, when present, is present in the composition from about 0.01 to about 4% based on the composition weight; and
   the ethylene maleic acid monoester copolymer, when present, is present in the composition, based on the concentration of the acid anhydride monoester, from about 1 to about 4% based on the composition weight.

2. The film of claim 1 wherein modifier is the maleic anhydride grafted metallocene-catalyzed linear low-density polyethylene.

3. The film of claim 1 wherein the modifier is the blend of ethylene butyl acrylate maleic anhydride copolymer and a copolymer of ethylene and ethyl acrylate.

4. The film of claim 3 wherein the maleic anhydride is present in the butyl acrylate maleic anhydride copolymer up to 3 wt % and the n-butyl acrylate is present in the butyl acrylate maleic anhydride copolymer greater than 6 wt %.

5. The film of claim 4 wherein the film is a multilayer film; the metallized film is the first layer; the film produced from the composition is the second layer; the film is optionally a food wrap comprising an additional polypropylene barrier layer, a heat sealable layer, or both.

6. The film of claim 1 wherein the modifier is the ethylene maleic acid monoester copolymer and is present in the composition based on the concentration of maleic acid monoester, from about 1 to about 2 weight %.

7. A process of contacting a first film to a metalized film where the first film is produced from a composition and a metalized film wherein the composition consists essentially of a polyolefin, modifier, optionally an ethylene copolymer derived from ethylene and alkyl (meth)acrylate, (meth)acrylic acid, or combination thereof, optionally from an acid anhydride or an acid anhydride monoester, wherein
   the modifer is maleic anhydride-grafted ethylene polymer, an ethylene butyl acrylate maleic anhydride copolymer, an ethylene maleic acid monoester copolymer, or combinations of two or more thereof;
   the ethylene polymer is a metallocene-catalyzed linear low-density polyethylene, a metallocene-catalyzed very low-density polyethylene, an ethylene polymer, or combinations of two or more thereof;
   the maleic anhydride-grafted ethylene polymer, when present, is present in the composition from about 0.01 to about 4% based on the composition weight; and
   the ethylene maleic acid monoester copolymer, when present, is present in the composition, based on the concentration of the acid anhydride monoester, from about 1 to about 4% based on the composition weight.

* * * * *